Oct. 9, 1928.
B. F. CANODE
SCREW DRIVER
Filed Oct. 19, 1926
1,686,681
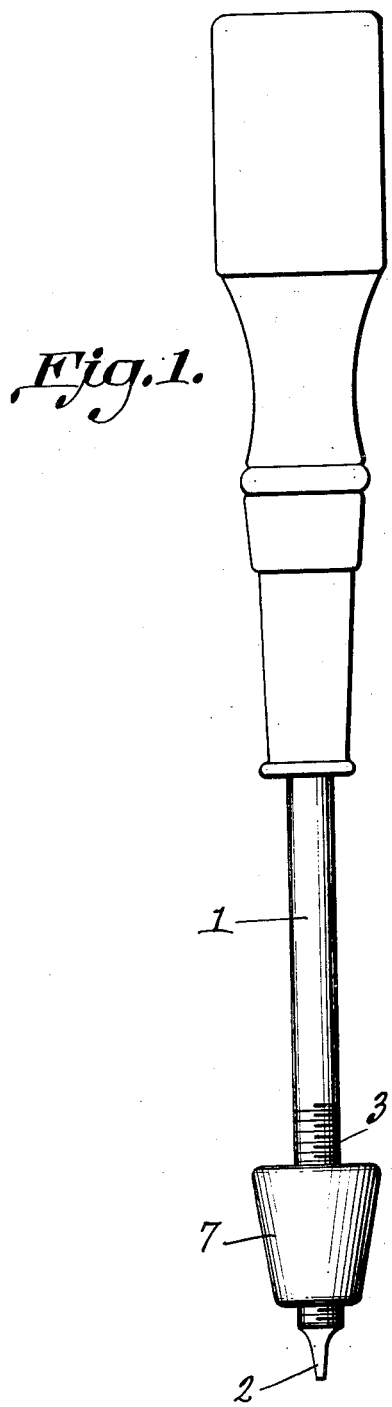
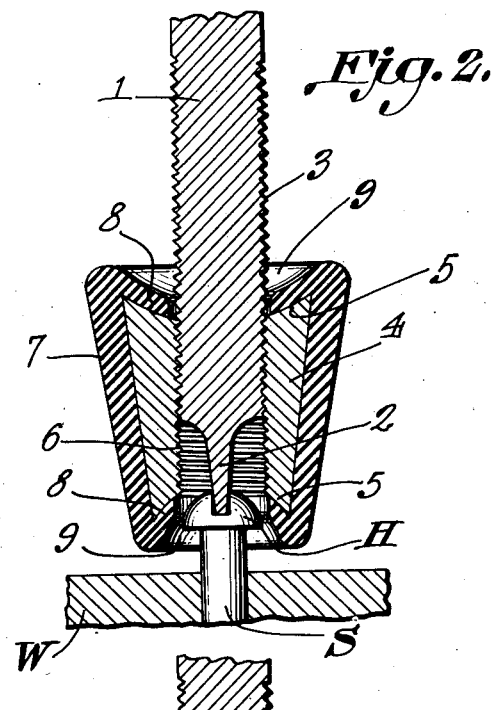
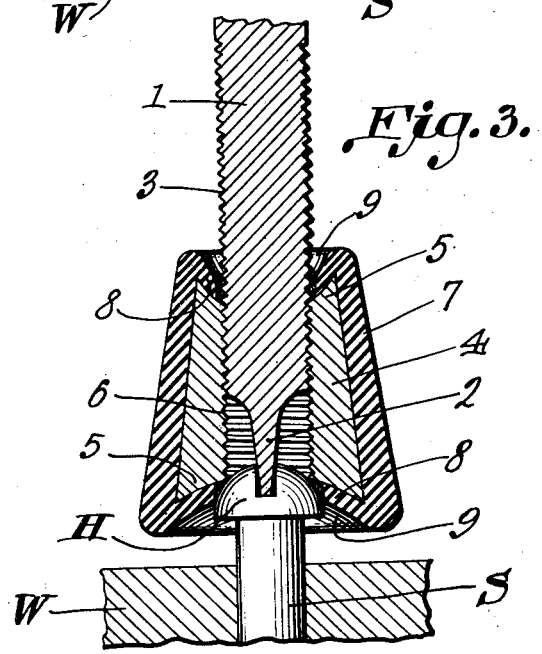
Benjamin F. Canode Inventor Patented Oct. 9, 1928.

1,686,681

UNITED STATES PATENT OFFICE.

BENJAMIN F. CANODE, OF AURORA, ILLINOIS.

SCREW DRIVER.

Application filed October 19, 1926. Serial No. 142,668.

This invention relates to a screw driver and more particularly to a means whereby a screw driver can be held properly assembled relative to the head of a screw while the screw is being driven into position, it being possible to use the device with screws of different sizes.

A further object is to provide a guide for the screw driver which is reversible and which will not scar the surface into which the screw is being forced.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

In the accompanying drawings, the preferred form of the invention has been shown.

In said drawings,

Figure 1 is an elevation of the device.

Figure 2 is an enlarged section through the bit end of the screw driver and the guide thereon, the bit being shown in engagement with a screw head.

Figure 3 is a view similar to Figure 2 showing the guide reversed for use in connection with a large screw.

Referring to the figures by characters of reference 1 designates the shank of a screw driver terminating in a screw engaging bit 2 and adjacent this bit the shank is provided with screw threads as shown at 3. The guide used in connection with the bit includes a shell 4 tapered toward one end and having each end dished or made concave as shown at 5. Extending longitudinally through the shell is a screw threaded bore 6 adapted to receive the threaded portion 3 of the shank 1. Thus by rotating the shank relative to the shell the bit can be brought to any desired position relative to either end of the shell. The shell 4 is encased in a jacket 7 formed preferably of soft rubber although other suitable protecting material may be used. The ends of this jacket are inturned as shown at 8 so as to rest snugly upon the concave end 5 of the shell but at the same time leave depressions 9 for the reception of screw heads.

In practice, if the device is to be used for driving a relatively small screw, the shell is arranged with the small end thereof adjacent the bit 2 as shown in Figure 2 and also in Figure 1. With the bit 2 positioned inwardly from the small end of the shell, said shell is placed around the head portion H of a screw head and the screw driver is then pressed and rotated as ordinarily for the purpose of driving the screw into the work. Shell 4 will rotate with the shank 1 and bit 2 until the end of the jacket 7 comes against the surface of the work W. Thereupon frictional contact of the jacket with the surface will cause the shell 4 to remain stationary but the shank 1 will continue to rotate and its thread 3, cooperating with the threads in the bore 6, will feed the shank 1 and bit 2 longitudinally relative to the shell 4 so that the screw will thus be forced further into the work even though the shell remains stationary. Obviously the shell serves to hold the bit of the screw driver in proper engagement with the head of the screw and the soft protecting jacket on the shell will prevent the work from being injured while the screw is being driven. Thus the device is particularly useful in cabinet work and in connection with other work where the greatest possible protection for the surface of the work is desirable.

What is claimed is:

The combination with a screw driver including a screw threaded shank and a bit, of an interiorly screw threaded shell mounted on the threaded portion of the shank, said shell being reversible on the shank and having one end larger than the other, there being a concentric recess in the small end of the shell and a larger concentric recess in the large end of the shell, and a soft protecting jacket on the shell and fitting snugly thereto, said jacket having inturned end portions seated in the respective recesses and providing spaces for the reception of the head of a screw engaged by the bit.

In testimony that I claim the foregoing as my own, I have hereto affixed my signature.

BENJAMIN F. CANODE.